United States Patent [19]

Berni

[11] 4,345,473

[45] Aug. 24, 1982

[54] VERTICAL COMPONENT ACCELEROMETER

[75] Inventor: Albert J. Berni, Houston, Tex.

[73] Assignee: Shell Oil Company, Houston, Tex.

[21] Appl. No.: 210,483

[22] Filed: Nov. 26, 1980

[51] Int. Cl.³ .............................................. G01P 15/09
[52] U.S. Cl. .............................. 73/516 LM; 310/329; 367/159; 367/166
[58] Field of Search .................... 73/516 R, 516 LM; 310/329; 367/155, 159, 166, 171

[56] References Cited

U.S. PATENT DOCUMENTS

| | | |
|---|---|---|
| 3,263,209 | 7/1966 | Madison .............................. 367/159 |
| 3,263,210 | 7/1966 | Schloss ................................ 367/159 |
| 3,810,083 | 5/1974 | Kostelnicek ........................ 310/329 |
| 4,163,206 | 7/1979 | Hall . | |

*Primary Examiner*—James J. Gill

[57] ABSTRACT

An accelerometer for measuring the vertical component of acceleration independent of the accelerometer orientation or the pressure. The accelerometer is particularly adapted for use in marine surveys in combination with a hydrophone to cancel the surface reflected wave.

10 Claims, 4 Drawing Figures

VERTICAL COMPONENT ACCELEROMETER

BACKGROUND OF THE INVENTION

It is conventional in offshore seismic operations to tow a long marine streamer cable behind an exploration vessel at a controlled depth. The streamer cable contains hydrophones that detect pressure variations produced by reflected seismic waves. The reflected seismic waves are the result of a seismic wave travelling through the earth and being reflected back to the surface. The seismic waves of course are produced by a seismic source, such as, an air gun. The signal produced by the streamer cable will have several frequencies of reduced amplitude as a result of the surface reflected wave or ghost.

The ghost is produced by an upgoing reflected wavefront striking a horizontal boundary, i.e., the ocean surface, and being reflected back to the hydrophone located below the surface. As the wavefront strikes the boundary, its polarity will be changed because of the negative coefficient of the air/water interface. Thus, if the distance between the hydrophone and the surface and back to the hydrophone is equal to one wave length of a particular frequency, or a multiple thereof, the amplitude of the frequency and its multiples will be reduced.

It has been appreciated as described in U.S. Pat. No. 3,283,293 that the frequencies cancelled by the above phenomena could be replaced by the use of geophones to record these frequencies. Geophones respond to the particle velocity of wave motion rather than the pressure. The wave of particle velocity will have a positive reflection coefficient at the air/water interface. Thus, if the distance between hydrophone and surface and back to the hydrophone is equal to one wave length of a particular frequency, or a multiple thereof, the amplitude of the frequency and its multiples will be increased. Thus, they would replace the frequencies that are removed in the hydrophone signals. Accelerometers could be used instead of geophones for this purpose. The accelerometer signal could be integrated electronically, or numerically in a computer after recording, to produce an estimate of the velocity signal. While it has been appreciated that geophones could be used to replace these missing frequencies, it is difficult to obtain a geophone or an accelerometer which will operate in a marine seismic environment. The large majority of geophones and accelerometers require that their axes be very carefully aligned in certain directions in order to obtain proper response. It can be readily appreciated that it is impossible to maintain the proper alignment of the axes in a marine streamer towed behind a vessel. In addition, most accelerometers are sensitive to pressures and thus respond to the pressures produced by the reflected seismic waves. The response to the pressure variations results in noise that tends to mask or cancel the true accelerometer signal.

BRIEF DESCRIPTION OF THE INVENTION

The present invention solves the above problems by providing an accelerometer which does not respond to pressure variations and does not require an accurate alignment of its sensitive axis. The accelerometer comprises two piezoceramic elements in the form of cylindrical shells; one being smaller than the other and mounted concentrically inside of the first one. The piezoceramic elements are chosen so that the outer surface of the larger element and the outer surface of the smaller element have the same polarity. In addition, the elements are mounted in a housing such that the space between the elements is filled with a conductive liquid that covers the smaller or inner element when the accelerometer is disposed with the common cylindrical axis horizontal. Rotations about the cylindrical axis make no difference in the geometry of the device since the fluid is free to move under the influence of gravity.

The accelerometer output is the signal appearing between the outer surface of the outer element and the inner surface of the inner element. Both surfaces are fully electroded. The surrounding fluid is in contact with both surfaces. A pressure increase in the surrounding fluid acts to expand the inner cylinder and compress the outer cylinder thus cancelling the pressure actuated part of the output signal. A pressure decrease causes the opposite polarity response but the same cancellation effect. All signals generated by accelerations of the inner cylinder would be cancelled because it is surrounded by a conductive fluid. The accelerometer sensitivity is thus provided by the outer cylinder. By symmetry, only the vertical component of acceleration causes an output from the outer cylinder.

An accelerometer constructed in this manner would be sensitive to motion in a direction perpendicular to the longitudinal axis of the elements. It would be a simple matter to mount this type of accelerometer with its longitudinal axis parallel to the axis of the marine streamer to detect upward and downward travelling accelerations. Also, twisting of the cable and rotation of the accelerometer about its longitudinal axis would not affect its sensitivity. The technique described above is not limited to cylindrical elements. In particular, spheres can also be used provided that the fluid can make contact with the inner surface of the inner sphere. The use of spheres would provide an accelerometer which would be sensitive to vertical acceleration for any device alignment.

BRIEF DESCRIPTION OF THE DRAWINGS

The present invention will be more easily understood from the following detailed description when taken in conjunction with the attached drawings in which.

PREFERRED EMBODIMENTS

Figure 1:
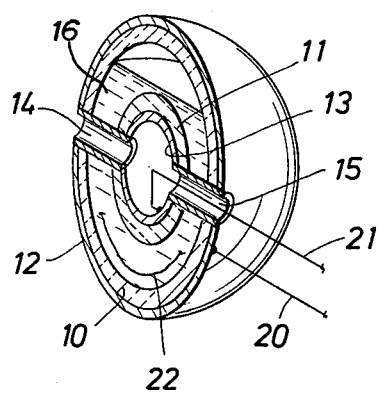
FIG. 1 is a perspective view of one embodiment of the invention using spherical shaped elements.

As explained above, the invention utilizes two piezoelectric elements with one being mounted inside of the other. The piezoelectric elements are ceramic type elements since they are easier to form in the proper shape than crystal type elements. The space between the two elements is filled with a conductive liquid that completely covers the inner element when the accelerometer is disposed in its normal operating position. As will be explained below, this effectively cancels the response of the accelerometer to pressure changes while preserving its response to accelerations. Referring particularly to FIG. 1, there is shown two spherical shaped piezoceramic elements 10 and 11 with the smaller element 11 being placed inside the larger element 10. Tubular members 14 and 15 support elements 10 and 11. Electrodes 13 and 12 are surface platings which provide electrical contact at the inner surface of element 11 and outer surface of element 10 respectively. In addition to coupling the two shells or housings together, tubular members also provide a means by which fluid communication may be established between the interior of element 11 and the exterior of element 10 and the surrounding fluid. Provision is made to electrically isolate these surfaces from the surrounding fluid by means of insulating coatings. The space between the two elements is filled with a conductive liquid 16, such as mercury, to a level which will cover the inner element as shown. The conductive fluid forms an electrode which is in contact with the ceramic surfaces. These surfaces are not plated so that electrical contact only occurs at the fluid contact surfaces.

Figure 2:
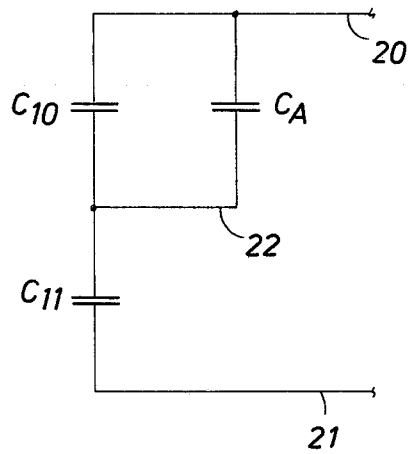
FIG. 2 is an equivalent electrical circuit for the embodiment of FIG. 1.

The leads 20 and 21 from the accelerometer are taken from the outer surface of the outer element 10 and the inner surface of the inner element 13, respectively. Electrical lead 22 makes contact with conductive fluid 16. The elements are selected so that when subjected to compression, they will have the same polarity on their surfaces. With the above configuration, the accelerometer when subjected to pressures will result in the outer element compressing while the inner element will expand. This movement of the elements will produce a voltage wherein the outer surface of the outer element and the inner surface of the inner element will have opposite polarity since they are stressed in opposite directions. Thus, since the voltages produced have opposite polarity, they will, in effect, cancel each other providing steps are taken to make their amplitude equal. A suitable means for equalizing the amplitudes of the two signals is shown in FIG. 2 where C-10 and C-11 represents the two elements and CA represents the adjusting capacitor. By proper sizing of the capacitor CA, it is possible to adjust the two amplitudes until they are equal and effectively cancel the response of the accelerometer to pressures.

When the accelerometer is subjected to an upward acceleration force, the outer element is compressed at its lower surface and expanded at its upper surface. Since the conductive fluid does not completely fill the outer element a voltage signal will only be produced on the lower surface. Likewise, since the conductive liquid completely covers the inner element no voltage signal will be produced by the inner element. The same responses are obtained for a downward acceleration except the polarity of the signal is reversed. Thus, the accelerometer responds to accelerations but not to pressure waves.

Figure 3:
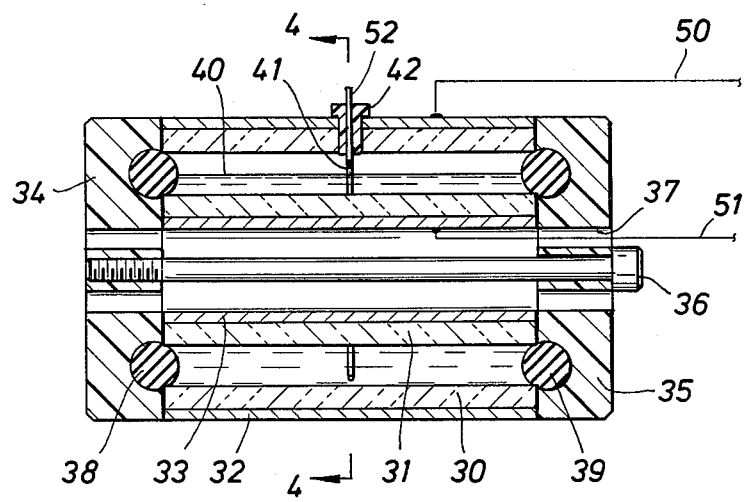
FIG. 3 is a longitudinal section of a second embodiment of the invention using cylindrical elements.
Figure 4:
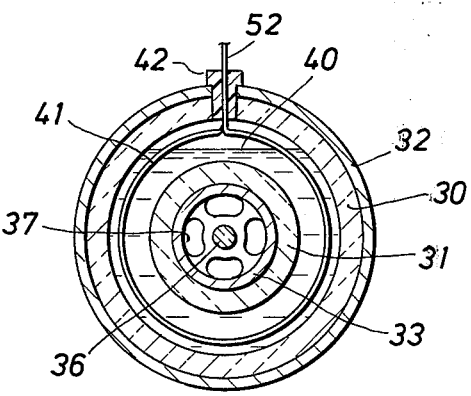
FIG. 4 is an end view of the embodiment shown in FIG. 3.

Referring now to FIGS. 3 and 4, there is shown a second embodiment of the invention in which cylindrical piezoelectric elements 30 and 31 are substituted for the spherical elements shown in FIG. 1. The element 30 is plated on its outer surface with a conducting metallic film 32 and a similar film 33 is plated on the element 31. Various metals may be used such as silver or berylium copper. The main requirement for the metal is its platability on the piezoelectric elements and the ease of attachment of conductors to the plating. The cylindrical elements are connected together by means of end caps 34 and 35 and a bolt 36 holds the assembly together. In addition, openings 37 should be placed in the end caps to provide fluid communication between the inner and outer elements. The volume between the two elements is sealed by means of circular plastic or rubber sealing rings 38 and 39. Likewise, the volume between the two elements should be filled with a conductive liquid, such as mercury, to a level 40 which completely covers the inner element. The leads 50 and 51 are taken from the outer surface of the outer element and the inner surface of the inner element as shown. The ground or common lead 52 is connected to a ring 41 that is disposed in the sealed volume between the two elements. A terminal seal 42 is secured in an opening in the element 30.

The accelerometer of FIGS. 3 and 4 will operate in the same manner as described above for the embodiment shown in FIG. 1 when subjected to accelerations in a direction perpendicular to the longitudinal axis of the elements. This simplifies the mounting of the accelerometer in a marine cable since the cylindrical shape conforms to the general shape of the cable. In addition, steps should be taken to insulate the accelerometer from any motion of the stress members or cables passing through the marine cable. This could be readily done by using suitable foam-type mounting means for the accelerometer which will permit it to respond to accelerations of the surrounding fluid while being insulated from movement of the cables and connectors within the cable.

What is claimed is:
1. An accelerometer for measuring the vertical component of acceleration comprising:
 a first and second hollow piezoelectric element, said second element being disposed within said first element;
 mounting means for securing said first and second elements in position and isolating the volume between said first and second elements;
 contact means for securing first and second leads to the outer surface of said first element and the inner surface of said second element;
 a conductive liquid, said liquid partially filling the volume between said first and second elements; and,
 means for coupling a third lead to said conductive liquid.
2. The accelerometer of claim 1 wherein the polarity of said first and second piezoelectric elements being chosen so that the charge on the inner surface of each has the same polarity when said elements are compressed.
3. The accelerometer of claim 1 or 2 wherein said first and second elements are cylindrical.
4. The accelerometer of claim 3 wherein said accelerometer is oriented with the axes of said elements in a horizontal plane.
5. The accelerometer of claim 1 wherein said contact means comprises a metallic film deposited on the surfaces of said elements.
6. The accelerometer of claim 5 and in addition, means for establishing fluid communication between the exterior of said first element and the interior of said second element.
7. The accelerometer of claim 6 wherein said first and second elements have spherical shapes.
8. The accelerometer of claim 6 wherein said first and second elements are tubular shaped.
9. The accelerometer of claim 1 wherein said conductive liquid is sufficient to completely cover the second element when said accelerometer is oriented in its normal operating position.
10. The accelerometer of claim 1 wherein said means for coupling said third lead to said conductive liquid comprises a circular wire surrounding said second element, said third lead being connected to said circular wire.

* * * * *